No. 792,559. PATENTED JUNE 13, 1905.
A. STECHBARTH.
WHEEL BEARING FOR MOTOR VEHICLES.
APPLICATION FILED OCT. 31, 1904.

Witnesses:
Robert H. Wei
Emil E. Dettmann

Inventor:
August Stechbarth
By John W. Hill
Atty.

No. 792,559.	Patented June 13, 1905.

UNITED STATES PATENT OFFICE.

AUGUST STECHBARTH, OF WEST PULLMAN, ILLINOIS.

WHEEL-BEARING FOR MOTOR-VEHICLES.

SPECIFICATION forming part of Letters Patent No. 792,559, dated June 13, 1905.

Original application filed January 23, 1904, Serial No. 190,370. Divided and this application filed October 31, 1904. Serial No. 230,754.

*To all whom it may concern:*

Be it known that I, AUGUST STECHBARTH, a citizen of the United States of America, residing at West Pullman, in the county of Cook and State of Illinois, have invented certain new and useful Improvements in Wheel-Bearings for Motor-Vehicles and the Like, of which the following is a description.

My invention relates to the driving-wheel hubs and the associated parts for supporting the wheels in place and transmitting a rotary effort to the same, and is a division of an application for United States Letters Patent filed by me January 23, 1904, Serial No. 190,370.

The object of my invention is to produce a simple and effective arrangement of wheel-hub, driving-shaft, and axle end to give the most convenient and serviceable results under the trying conditions to which these parts are exposed; and to this end it consists in the novel construction, arrangement, and combination of parts herein shown and described, and more particularly pointed out in the claims.

Figure 2:
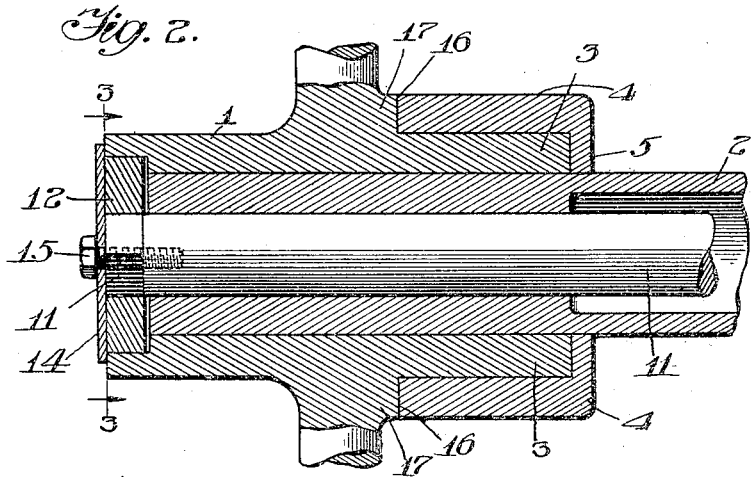
Figure 1:
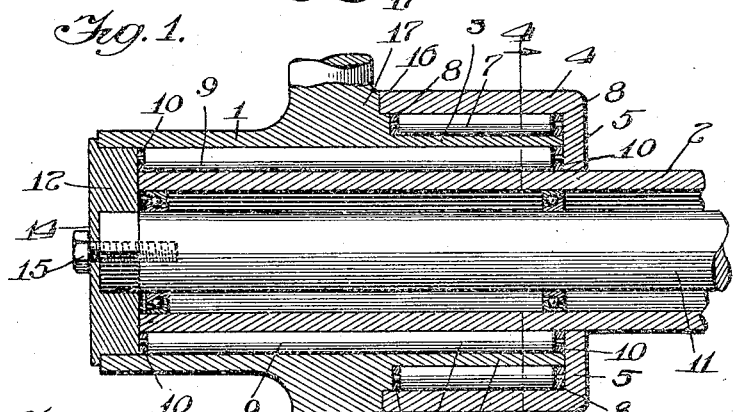
Figure 3:
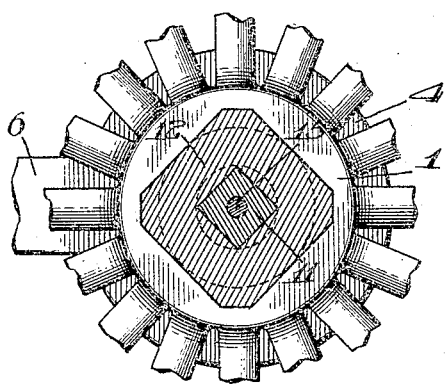
Figure 4:
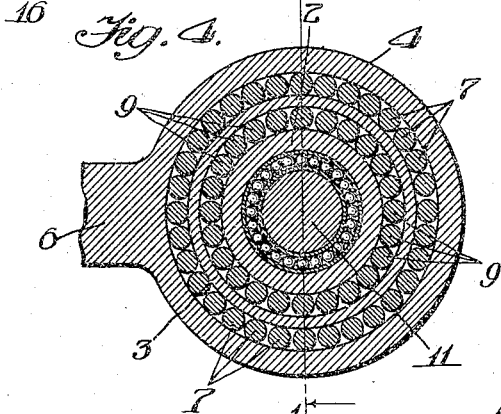

In the accompanying drawings, wherein like or similar reference characters indicate like or corresponding parts, Figure 1 is a longitudinal section of my device, taken substantially upon the line 1 1 of Fig. 4. Fig. 2 is a section similar to that shown in Fig. 1, showing plain bearings between the parts. Fig. 3 is a section taken substantially on line 3 3 of Fig. 2, and Fig. 4 is a section taken substantially on line 4 4 of Fig. 1.

In the preferred form of my device shown in the drawings, 1 is the central or hub portion of a vehicle-wheel, the interior of which forms a bearing upon the extremity of the axle 2. A part 3 of the exterior of the hub 1 is suitably formed to operate as a journal, and a part 4 is provided to embrace the part 3 of the hub and operate as an additional bearing or support between the wheel and the body or other parts of the vehicle.

Preferably at one end of the part 4 a flange 5 is provided, which may extend to and be connected with the axle 2 in any suitable manner, thus excluding dust or other foreign substances from the bearings at this point, while an arm 6 may be attached to or formed integral with the part 4 and serve to connect this part to the vehicle-body.

Any desired form of bearing may be employed in these bearings. As shown in Fig. 1, rollers 7 7 are mounted in a suitable cage 8 8 and arranged in the manner usual in roller-bearings between the part 3 of the hub and the part 4, and similar rollers 9 9 in a cage 10 10 are arranged between the hub 1 and the axle 2, while in Fig. 2 both these bearings are shown as ordinary plain bearings, and it is obvious that in some cases, if desired, one of these bearings may be of the kind shown in Fig. 1 and the other of the kind shown in Fig. 2.

The shaft 11 is provided to transmit power from the driving mechanism to the wheels. The driving mechanism may consist of pedals or levers adapted to be manually operated or any preferred style of motors and the power may be transmitted therefrom by any preferred means.

A suitable bearing is formed within the axle 2 for the shaft 11, so arranged that the shaft is positioned at the center of the hub. Any preferred form of bearing may be arranged between the axle and the shaft 11. As shown in Fig. 1, ball-bearings of the usual and well-known form are employed, while in Fig. 2 the shaft is inclosed in a common plain bearing.

The power from the shaft 11 may be communicated to the wheels by means of a driver 12 between the shaft 11 and the hub 1, as shown. The hub 1 and shaft 11 each extend slightly beyond the end of the axle 2, and the driver 12 is formed of suitable material to fit upon the projecting end of the shaft and into the projecting end of the hub, means being provided to prevent rotary movement between the shaft and driver and also between the driver and hub.

Any preferred means may be employed to prevent the movement between the parts above described. Obviously suitable keyways and keys may be provided to accomplish this result; but the preferred arrangement shown in the drawings consists in squaring or otherwise so forming the projecting end of the shaft 11 and the coöperating opening in the driver 12 as to prevent any motion between them and similarly arranging the coöperating surfaces of the driver 12 and hub 1, or, if preferred, the driver may be formed integral with the hub or permanently attached thereto in any desired manner.

Preferably a plate 14 is attached to the end of the shaft 11 by means of a cap-screw 15 or equivalent means, the plate being of suitable size to extend beyond the driver 12 and engage the end of the hub, as shown in Figs. 1 and 2. This plate serves a double purpose: First, it secures the wheel to the axle and prevents the displacement of the driver 12, and, second, it overlaps all the openings into the end of the hub and by being fitted tightly at its periphery to the end of the hub prevents the entrance of grit or other foreign substances into the bearings, and also may be arranged to prevent the escape of oil therefrom.

Obviously, if preferred, the driver 12 and the plate 14 may be formed from a single piece, as shown in Fig. 1. Particular attention is drawn to the fact that there are only two points where grit or other undesirable substance can enter the bearings, hence only two points where oil or other lubricant can escape. One of these points is at 16, where the end of the part 4 lies in proximity to a shoulder 17, which may be formed upon the hub 1, the other point the opening into the axle, and it is evident that both of these places may be provided with felt washers or other means to prevent any trouble.

Having thus described my improvement, it is obvious that immaterial modifications may be made in my device without departing from the spirit of my invention. Hence I do not wish to be understood as limiting myself to the exact form or construction shown.

What I claim as new, and desire to secure by Letters Patent, is—

1. A device of the kind described, comprising a wheel-hub, an axle, a rotatable driving-shaft, and a bearing inclosing a portion of said hub, a bearing within the hub inclosing a part of said axle and a bearing within the axle inclosing a part of said driving-shaft, in combination with means for transmitting the motion of the shaft to the hub.

2. In a vehicle the combination of a wheel-hub, an axle a rotatable driving-shaft and a bearing attachable to the body of said vehicle and inclosing a portion of said hub, a bearing within said hub inclosing a portion of said axle, a bearing within the hub and axle inclosing a portion of said driving-shaft and means for rigidly attaching said shaft to said hub.

3. A device of the kind described, comprising a wheel-hub, an axle, a rotatable driving-shaft and a bearing inclosing a part of said hub, a bearing formed upon the interior of said hub inclosing a part of said axle, and a bearing formed upon the interior of the part of the axle within the hub inclosing a part of said driving-shaft, in combination with a driver fixed upon the extremity of said shaft and fixedly engaging said hub.

4. A device of the kind described, comprising the combination of a wheel-hub, an axle, a driving-shaft and a bearing rigidly attached to said axle and inclosing a portion of said hub, a bearing formed within the hub inclosing a part of said axle, a bearing formed within the axle and positioned within the hub inclosing a part of said driving-shaft a driver fixed near the end of said driving-shaft and engaging said hub.

5. A device of the kind described, comprising the combination of a wheel-hub, an axle, a rotatable driving-shaft, and a bearing inclosing a portion of said hub, a bearing within said hub inclosing a portion of said axle a bearing within said axle inclosing a portion of said driving-shaft, a driver fixed upon said shaft and engaging said hub, and a plate attached to the end of said shaft and extending outward beyond said driver.

6. A device of the kind described, comprising the combination of a wheel-hub, an axle, a rotatable driving-shaft and a bearing inclosing a portion of said hub, a bearing within said hub inclosing a portion of said axle, a bearing within said axle inclosing a portion of said driving-shaft, and a driver formed upon said hub and rotatably engaging said driving-shaft.

In testimony whereof I have hereunto signed my name in the presence of two subscribing witnesses.

AUGUST STECHBARTH.

Witnesses:
BURTON U. HILLS,
CHARLES I. COBB.